122. LIQUID HEATERS & VAPORIZERS,
Examiner
44 122-44 44
July 28, 1936. J. FLETCHER Re. 20,045
HEAT EXCHANGER METHOD AND APPARATUS Orig. 1,975,095
Original Filed April 23, 1929 2 Sheets-Sheet 1
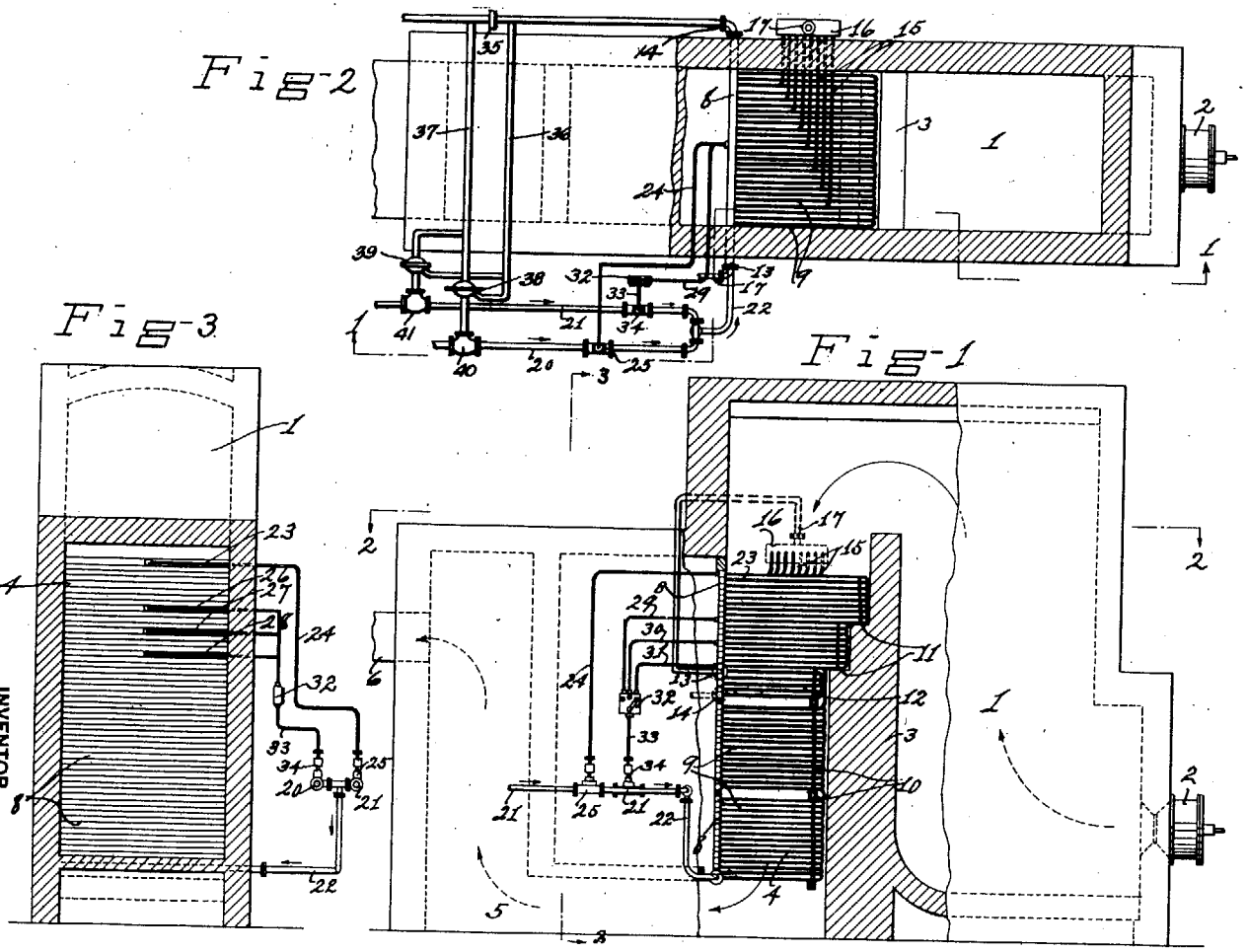
INVENTOR
James Fletcher
BY
Gifford, Scott & Burgess
ATTORNEYS

122. LIQUID HEATERS & VAPORIZERS,

448

Examiner

July 28, 1936. J. FLETCHER Re. 20,045

HEAT EXCHANGER METHOD AND APPARATUS

Original Filed April 23, 1929 2 Sheets-Sheet 2

INVENTOR
James Fletcher
BY Blair R. Nevcomb
ATTORNEY

122. LIQUID HEATERS & VAPORIZERS.

448

Examiner

Reissued July 28, 1936

Re. 20,045

UNITED STATES PATENT OFFICE 20,045

HEAT EXCHANGER METHOD AND APPARATUS

James Fletcher, Akron, Ohio, assignor to The Babcock & Wilcox Company, Bayonne, N. J., a corporation of New Jersey Original No. 1,975,095, dated October 2, 1934, Serial No. 357,419, April 23, 1929. Application for reissue October 18, 1935, Serial No. 45,618

46 Claims. (Cl. 122—448)

Figure 4:
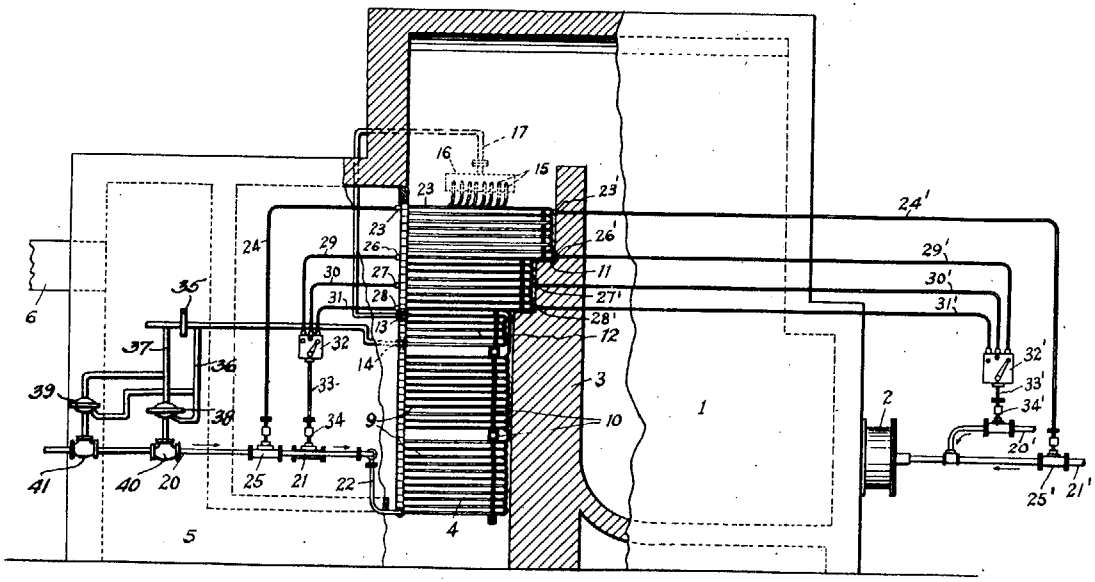

This invention relates to the construction and operation of a steam boiler in which drums are not used. It provides a safe and practical apparatus for and method of operating a series flow, steam generating unit, comprising tubes supplied with water at one end of the series and discharging steam of any desired quality or temperature without circulation or separation of steam from water. The feed water supply to this type of unit must of necessity be continuous and at all times equal to the weight of steam leaving the unit. Furthermore, this type of unit having no substantial reserve water capacity, and the fluid in motion in the circuit varying from water to steam with intermediate percentages of steam and water mixture, cannot be equipped with any water level indicating device such as the standard water gauge glass to establish a safe operating condition. The steam is generated in tubes as needed and the water is fed to the tubes at such a rate that the tubes are prevented from being burned out and the regulation of the feed water to the tubes is such that steam of the desired amount and quality may be obtained.

The invention will be understood from the description in connection with the accompanying drawings in which Fig. 1 is a side view partly in section showing an illustrative embodiment of the invention; Fig. 2 is a section along the line 2—2 of Fig. 1 and Fig. 3 is a section along the line 3—3 of Fig. 1. Fig. 4 is a view similar to Fig. 1, but showing the addition of means controlling the elements of combustion. In the drawings, reference character 1 indicates a furnace that may be fired by means of fuel burners 2, for example. A bridge wall 3 is provided at the rear of the furnace and the products of combustion pass over the upper edge of this furnace and thence downwardly through a flue 4. A passage 5 extends from the lower end of the flue to the outlet 6 for the waste products of combustion.

Horizontally disposed headers 8 are shown as being superimposed one upon the other and constituting one side of the flue 4, the bridge wall 3 constituting the opposite side of the flue. The side walls of the boiler constitute the other sides of the flue. Rows of U-shaped tubes 9 connect each header to the next one above, and these tubes extend across the flue 4. The ends of the tubes 9 opposite the headers 8 may be supported by means of supports 10 and the upper tubes are longer than the others and rest upon ledges 11 of the bridge wall 3. A superheater 12 is indicated near the middle of the flue 4, the superheater headers being shown at 13 and 14.

A series of outlet tubes 15 extends from the upper header 8 to a header 16 located outside of the furnace walls and a pipe 17 extends from the header 16 to the inlet header 13 of the superheater.

Two feed pipes 20 and 21 lead to a connection 22 which in turn leads to the lowermost header 8 for feeding water to the boiler. The water is forced into the boiler through the pipes 20 and 21 by pumps (not shown). A thermostat is located in contact with the uppermost header 8 and is connected by the connections 24 to a thermostatically controlled valve 25 in the feed pipe 20. Other thermostats 26, 27 and 28 are located in contact with intermediate headers 8 and are connected by the connections 29, 30 and 31 to a switch box 32 that is connected by the connection 33 to the thermostatically controlled valve 34 in the feed pipe 21. The arm of the switch box can be set so that the valve 34 is controlled by either one of the thermostats 26, 27 or 28, and any desired number of thermostats in contact with the intermediate headers 8 may be employed.

Operation is as follows:

The valves 25 and 34 and thermostats may be so arranged that all of the water that enters through the feed pipe 22 is evaporated by the time it reaches the tubes 9 that are connected to the uppermost headers 8, and the steam leaving through the tubes 15 is preferably saturated and becomes superheated on passing through the superheater 12. The adjustments may be so made that the water attains the saturation temperature on reaching the header to which the thermostat controlling the valve 34 is connected. If the water does not attain the saturation temperature at this point, the thermostat will operate the valve 34, partially closing it and thereby decreasing the supply of water. On the other hand, if the temperature exceeds the saturation temperature on reaching the header to which the thermostat 23 controlling the valve 25 is connected, indicating that the steam is becoming superheated and that the tubes are in consequence endangered the thermostat 23 operates valve 25 opening it to admit more water. In this manner the quality of the steam generated is kept substantially uniform.

Instead of having the feed of water to the boilers automatically controlled by the thermostats as described above, the thermostats may be connected to indicators that are in view of the operator so that he can regulate the rate of feed to the boiler in accordance with the requirements.

The heating surface in the type of boiler described above is in a continuous path, which may be regarded as comprising an economizer section, a steam generating section and a superheater section. The economizer section is the portion in which the temperature of the incoming water is increased to that corresponding to saturated steam temperature; the steam generating section is the portion in which complete evaporation of the water takes place without change in temperature; and the superheater section is the portion in which the steam temperature is increased. The actual division points between the economizer and steam generating sections and also between the steam generating and superheater sections vary slightly with the rate at which the boiler is operated but can be predetermined closely for any condition of operation.

Great care is required to operate satisfactorily a boiler of this sort within safe limits. When the water and steam flow countercurrent to the direction of flow of the heating gases, the outlet end of the steam generating section is exposed to the gases of highest temperatures, thus requiring special care to avoid burning the tubes at this place. The steam from the steam generating section passes into the superheater section in a more or less protected space between tubes of the steam generating and economizer sections. In such a boiler the danger point to be carefully protected is the upper row of boiler tubes because this row of tubes is not only contacted by the hottest gases but the fluid passing through them is approximately dry steam which is relatively the poorest heat absorbing medium. The boiler should be operated under conditions that give either dry saturated steam or the highest quality of steam leaving the steam generating section that is consistent with safe tube metal temperature. In the usual installations the saturation temperature of the steam at the working pressure can be assumed to be the safe temperature for the metal.

Saturation temperature in the tubes of the steam generating section at the outlet may be maintained very easily by an operator by observing the readings of a temperature indicator located at this point and manually controlling the feed water or by automatic control by means of a thermostat located at this point. A temperature indicator or thermostat does not however indicate the quality of the steam because the temperature is the same whether the fluid is all water at the steaming temperature or all dry saturated steam. Therefore, while this single point indicator or thermostat might assure a safe working condition, it would not offer any means of controlling the desired steam conditions. By the present invention the quality of the steam may be controlled and safe working conditions maintained.

The thermostats or temperature indicating devices may be used to guide an operator in manually controlling the feed water or the thermostats may control the feed water automatically. One of the thermostats should be located at the division point between the economizer section and the steam generating section and another thermostat should be located at the division point between the steam generating section and the superheater section. The steam generating section should be maintained at saturation temperature throughout its entire length for safe and satisfactory operation. If the temperature at the division point between the economizer section and the steam generating section falls below saturation temperature the steam at the division point between the steam generating section and the superheater section will contain moisture resulting in low steam temperature at the superheater outlet. If saturated steam temperature is reached in the economizer section before the division point between the economizer section and the steam generating section is reached, the steam will begin to be superheated at some point in the steam generating section, resulting in high superheat outlet temperature and danger to the steam generating section tubes due to overheating of the same by being exposed to the maximum furnace temperatures. A temperature above saturation at the division point between the steam generating section and superheater section indicates a dangerous condition that can be remedied by the operator opening a feed water valve when the control is manual or by the thermostat 23 opening the valve 25 as shown in Figs. 1 and 2. A temperature below saturation at the division point between the economizer and the steam generating section would indicate an excess supply of water and the operator could either manually decrease the supply of water or the valve 34 would be automatically closed to some extent.

The positions where the thermostats 26, 27 and 28 should be located depend upon the heating surfaces and the direction of flow of the internal medium, or steam and water in relation to the flow of the hot gases as well as the state of the medium, and the rate of flow in tube sections that are exposed to the highest temperatures. The connection of the thermostats 26, 27 and 28 to the switch 32 makes it possible to control the valve 34 automatically to give the desired quality of steam.

This invention is also applicable to the control of temperatures in which the flow of hot gases over the tubes is in the same direction as the flow of the water and steam through the tubes instead of being countercurrent thereto as indicated in the illustrative embodiment of the invention. With such an arrangement safe working conditions may be maintained simply by having one temperature control arrangement located either at the steam generating section outlet or at the superheater section outlet arranged to increase or decrease the feed water supply according to the rise or fall in temperature.

Instead of having the thermostats to control the feed water supply, they may be used in a similar manner to control the heat input into the furnace, particularly where the furnace is heated by means of fuel oil, gas or pulverized coal. In such case, with countercurrent flow of water and hot gases, the thermostat located at the division point between the steam generating section and the superheater section would be set to maintain a normal opening of the fuel supply at saturation temperature and to reduce the fuel supply when the temperature exceeded the saturation temperature. The thermostat located at the division point between the economizer section and the steam generating section would be set to increase the fuel supply when the temperature at which it is located fell below the saturation temperature and it would maintain the normal fuel supply at the saturation temperature. With the water and hot gases flowing in the same direction, the thermostat located at the outlet would be set to decrease or increase the fuel supply with the rise or fall

448

Examine in the temperature at the outlet. In both cases, the feed water supply is controlled by a pressure regulating device so as to regulate the amount of feed water supply in accordance with variations in the amount of steam passing out, thereby maintaining constant pressure of the steam at the outlet. The control for the feed water supply in accordance with variations in the amount of steam passing out, is illustrated in both Figs. 2 and 4 diagrammatically, and may consist of a flow metering orifice 35 in the vapor generator outlet from the header 14, and on either side of which pressure taps 36 and 37 lead to each side of the diaphragms 38 and 39, respectively, which operate valves 40 and 41 also, respectively, in the liquid supply elements 20 and 21. The pressure differential created by flow through the metering orifice 35 is thus utilized to position the valves 40 and 41 responsive to variations in the amount of steam passing out of the generator.

It is to be noted that the invention herein set forth includes a method of producing a fluid of high heat content, and by this expression I refer to a fluid which has absorbed heat to the point of vaporization, and which then receives the latent heat of vaporization and therefore at once has its heat content elevated substantially.

As indicated in Fig. 4, at least one or all of the elements of combustion may be controlled by thermostats 23', 26', 27' and 28' corresponding in location to the thermostats previously described in connection with the control of feed water, these thermostats operate valves 25' and 34', the resultant effect of which may be varied by a selector 33', though, of course, the actuation of valves 25' and 34' is to decrease the heat input upon a rise in temperature and increase it upon a fall in temperature. Any other suitable and well known type of control other than that shown may be selected as a part of the combination for regulating the elements of combustion.

I claim:

1. The method of operating a boiler having tubes connected in series to convert all of the entering water into steam in one passage therethrough, which includes the steps of indicating temperature thermostatically at different portions of the heat transfer surfaces of the boiler and controlling the feed water to the boiler in accordance with the temperature existing simultaneously at the thermostats.

2. The method of operating a boiler having tubes connected in series to convert all of the entering water into steam in one passage therethrough, which includes the steps of heating the successive surfaces of said boiler to progressively increasing temperatures, passing water into contact with said surfaces in the direction of the increasing temperatures, locating thermostats in proximity to said surfaces at different portions of said boiler and regulating the amount of water in accordance with said temperatures existing simultaneously.

3. The method of operating a boiler having tubes connected in series to convert all of the entering water into steam in one passage therethrough, which includes the steps of indicating temperature thermostatically at different portions of the heating surfaces of the boiler and controlling the feed of water to the boiler in accordance with the temperatures existing simultaneously at the thermostats, so as to maintain at a predetermined region the point where the steam begins to become superheated.

4. The method of operating a boiler having tubes connected in series which includes the steps of forcing water through said tubes, passing hot gases over said tubes in a countercurrent direction, indicating temperature thermostatically with thermostats at different portions of the boiler and in proximity to said tubes, and controlling the amount of water in accordance with the temperatures existing simultaneously at the thermostats.

5. The method of operating a series boiler which comprises forcing water through the tubes thereof and regulating the feed of a portion of the water by the temperature of the fluid intermediate the ends of the flow path and the feed of another portion of the water by the temperature of superheated steam leaving said tubes.

6. The method of operating a boiler having tubes connected in series which includes the steps of simultaneously indicating temperature near the point where steam begins to be generated and near the point where evaporation of the water is substantially complete, and using the indicated temperature to adjust heat and liquid inputs to control temperature of said tubes.

7. The method of operating a boiler having tubes connected in series, indicating temperature thermostatically near the point where steam begins to be generated and near the point where evaporation of the water is substantially complete, and controlling in accordance with simultaneously existing temperatures the rate at which water is fed into said tubes.

8. The method of operating a boiler having tubes connected in series which includes the steps of measuring the temperatures at points approximately where steam begins to be generated and where generation of steam is completed, and regulating boiler operation in accordance with simultaneously existing temperatures for maintaining said points substantially unchanged.

9. The method of producing high temperature vapor which comprises establishing a continuous fluid flow under pressure initiated with liquid entering at one end only and progressively heated for conversion to complete vapor state at another zone, and adjusting the zone of conversion to complete vapor state by varying the fluid flow through adjustment dependent upon combined temperature indication at several points along the flow path.

10. In a boiler, a heated continuous fluid path receiving water at one end only, progressive portions thereof functioning as economizer, steam generator and superheating sections, temperature responsive means in different portions of the path indicating necessity of adjustment of the water flow to the path, and water inlet controlling means whereby the water inflow may be adjusted in accordance with the combined temperature responsive means to confine the economizer, steam generator and superneating functions to predetermined sections of the path.

11. The method of producing high temperature vapor which comprises establishing a continuous fluid flow under pressure initiated with liquid entering at one end only and progressively heated for conversion to complete vapor state at another zone, and adjusting the zone of conversion to complete vapor state by controlling the elements of combustion through adjustment dependent upon combined temperature indication at several points along the flow path.

12. The method of producing high temperature vapor which comprises establishing a continuous fluid flow under pressure initiated with liquid entering at one end only and progressively heated for conversion to complete vapor state at another zone, and adjusting the zone of conversion to complete vapor state by controlling fuel combustion through adjustment depending upon combined temperature indication at several points along the flow path.

13. The method of producing high temperature vapor which comprises establishing a continuous fluid flow under pressure initiated with liquid entering at one end only and progressively heated for conversion to complete vapor state at another zone, and adjusting the zone of conversion to complete vapor state by controlling gas combustion through adjustment depending upon combined temperature indication at several points along the flow path.

14. The method of producing high temperature vapor which comprises establishing a continuous fluid flow under pressure initiated with liquid entering at one end only and progressively heated for conversion to complete vapor state at another zone, and adjusting the zone of conversion to complete vapor state by controlling pulverized coal combustion through adjustment depending upon combined temperature indication at several points along the flow path.

15. A generator for producing high temperature vapor comprising, a continuous fluid flow path, means for entering liquid thereto under pressure at one end only, means for progressively heating said fluid flow for conversion of the liquid to complete vapor state in a single traverse therethrough, means for introducing elements of combustion for heating the generator, and means adjusting the zone of conversion of the liquid to complete vapor state by varying combustion through adjustment dependent upon combined temperature indication at several points along the flow path.

16. The method of generating superheated vapor of constant pressure and superheat temperature in a once-through heated fluid path, which comprises establishing a pressure fluid flow along the path with liquid at one end, raising the temperature of the fluid path to convert the fluid into superheated vapor intermediate the ends of the path, and establishing a predetermined division of the fluid path into saturation and superheat zones from a measure of the excess temperature over saturation at a selected location along the fluid path.

17. A steam generator, comprising at least one tube for the working medium, means for heating said tube, means for supplying working medium to said tube, means for supplying elements of combustion to the heat-producer, and means for regulating the quantity of one of these substances delivered to the generator by the temperature of the working medium at that zone in the tube where, under normal conditions, the working medium begins to change from saturated to superheated steam.

18. A steam generator, comprising at least one tube for the working medium, means for heating said tube, means for supplying working medium in a plurality of portions to said tube, means for supplying elements of combustion to the heat-producer, and means for regulating the quantity of one of the portions of the working medium delivered to the generator, by the temperature of the working medium at that zone in the tube where, under normal conditions, the working medium begins to change from saturated to superheated steam.

19. A steam generator, comprising at least one tube for the working medium, means for heating said tube, means for supplying working medium to said tube in a plurality of portions, means for supplying elements of combustion to the heat producer, and means for regulating the quantity of at least one portion of the working medium delivered to the generator, by the temperature of the working medium at that zone in the tube where, under normal conditions, the working medium begins to change from saturated to superheated steam.

20. The method of generating superheated vapor in a once through heated fluid path, which comprises forcing a liquid supply to one end of the path, raising, successively along the path, the temperature of the liquid, evaporating liquid at saturation temperature, raising the temperature of the vapor, and then using a change in temperature in the fluid flow at a point slightly beyond the vaporization zone for normal operating conditions to regulate liquid and/or heat input whereby the extent of fluid flow path operating under saturated and superheat conditions is controlled.

21. A method of operating a vapor generator having a once-through fluid passage receiving liquid at one end and heated by elements of combustion to deliver superheated vapor at the other end, which comprises evaluating the liquid supply to the vapor output for a normally balanced weight rate ratio establishing along the flow path a normal zone approximately representative of change in phase from liquid to complete vapor state, readjusting the weight rate ratio of liquid to vapor in consonance with departure from said zone, and regulating the elements of combustion to increase or decrease the heat release, respectively, with a decrease and increase in temperature.

22. The method of controlling the operation of a vapor generator having a small liquid storage with a high rate of evaporation and heated by elements of combustion, which includes the steps of normally controlling the inflow of liquid in accordance with a measure of vapor outflow, and controlling the heating solely in accordance with indications of conditions of the fluid.

23. The method of controlling the operation of a vapor generator having a once-through fluid path receiving liquid under pressure at one end and delivering superheated vapors at the other and heated by elements of combustion, which includes the steps of normally controlling the inflow of liquid in accordance with a measure of vapor outflow, and controlling the supply of at least one of the elements of combustion in accordance with an indication of temperature at a location in the fluid flow path just beyond the saturation line.

24. The method of controlling the operation of a vapor generator having a once-through fluid path receiving liquid under pressure at one end and delivering superheated vapor at the other and heated by elements of combustion, which includes the steps of normally controlling the inflow of liquid in accordance with a measure of vapor outflow, controlling the supply of at least one of the elements of combustion in accordance with an indication of condition of the fluid, and modifying the control of both the inflow of liquid and the supply of at least one of the elements of combustion from an indication of temperature at a location in the fluid flow path just beyond the saturation line.

25. The method of producing high temperature vapor which comprises establishing a continuously progressive fluid flow under pressure initiated with liquid entering at one end only and progressively heated for conversion to complete vapor state at another point, and adjusting the point of conversion to complete vapor state by controlling the liquid inflow and heating through adjustments depending upon a measure of temperature at a location in the fluid flow path just beyond the saturation line.

26. The method of producing high temperature vapor which comprises establishing a continuously progressive fluid flow under pressure initiated with liquid entering at one end only and progressively heated for conversion to complete vapor state at another zone, and adjusting the proportion of the fluid flow path wherein is vapor only by controlling the rate of liquid inflow and the rate of heating through adjustment dependent upon a measure of temperature at a location in the fluid flow path just beyond the saturation line.

27. Apparatus for controlling the operation of a vapor generator having a once-through fluid path receiving liquid under pressure at one end and delivering superheated vapor and heated by elements of combustion, comprising in combination, a furnace, liquid supplying means to said path, fuel supplying means to said furnace, apparatus for maintaining liquid inflow substantially equal to vapor outflow, means also controlling the liquid inflow and responsive to an indication of temperature at a location in the fluid flow path just beyond the saturation line, apparatus responsive to vapor outflow condition for controlling the rate of supply of fuel to the furnace, and means also controlling fuel supply and responsive to the said indication of temperature.

28. Apparatus for controlling the operation of a vapor generator having a once-through fluid path receiving liquid under pressure at one end and delivering superheated vapor and heated by elements of combustion, comprising in combination, a furnace, liquid supplying means to said path, fuel supplying means to said furnace, a device responsive to the output of the generator, an indicator of temperature at a location just beyond the saturation line of the path, an indicator of condition of vapor outflow, means responsive to said device for controlling the liquid supplying means, means responsive to said condition indicator for controlling the fuel supplying means, and means responsive to said indicator of temperature for modifying the liquid inflow supply and the fuel supply.

29. Apparatus for controlling the operation of a vapor generator having a once-through fluid path receiving liquid under pressure at one end and delivering superheated vapor and heated by elements of combustion, comprising in combination, a furnace, liquid supplying means to said path, supplying means of the elements of combustion to said furnace, apparatus for maintaining the liquid inflow substantially equal to vapor outflow, means also controlling the liquid inflow and responsive to an indication of temperature at a location in the path just beyond the saturation line, apparatus controlling the supply of at least one of the elements of combustion to the furnace and responsive to a condition of vapor outflow, and means also effective in controlling the supply of at least one of the elements of combustion to the furnace and responsive to the indication of temperature.

30. The method of controlling the operation of a vapor generator having a once-through fluid path receiving liquid at one end and delivering superheated vapor at the other and heated by elements of combustion, which includes the steps of normally maintaining the inflow of liquid, substantially equal to the outflow of vapor, readjusting the relation between inflow and outflow in accordance with an indication of temperature at a location in the fluid flow path just beyond the saturation line, and controlling the supply of at least one of the elements of combustion solely in accordance with indications of conditions of the fluid.

31. The method of controlling the operation of a vapor generator having a once-through fluid path receiving liquid under pressure at one end and delivering superheated vapor at the other and heated by elements of combustion, which includes the steps of normally controlling the inflow of liquid in accordance with a measure of vapor outflow, and controlling the supply of at least one of the elements of combustion solely in accordance with indications of conditions of the flowing fluid.

32. The method of operating a vapor generator having a small liquid storage with a high rate of evaporation and heated by elements of combustion, which includes the steps of normally controlling the inflow of liquid in accordance with a measure of vapor outflow, and controlling the heating in accordance with indication of condition of the fluid.

33. The method of operating a vapor generator having a small liquid storage with a high rate of evaporation and heated by elements of combustion, which includes the steps of normally controlling the inflow of liquid in accordance with the vapor outflow, and controlling the heating in accordance with a condition of the fluid.

34. The method of operating a vapor generator having a once through fluid path receiving liquid under pressure at one end and delivering superheated vapor at the other and heated by elements of combustion, which includes the steps of normally controlling the inflow of liquid in accordance with a measure of vapor outflow, and controlling the supply of the elements of combustion in accordance with indication of condition of the flowing fluid.

35. The method of operating a vapor generator having a once through fluid path receiving liquid under pressure at one end and delivering superheated vapor at the other and heated by elements of combustion, which includes the steps of normally controlling the inflow of liquid in accordance with the vapor outflow, and controlling the heating in accordance with a condition of the fluid.

36. The method of operating a heat exchanger having a once through fluid path, which comprises establishing a continuous pressure flow of fluid through the path, heating the path, and maintaining a condition of such fluid at a selected different value in each of several predetermined sections of the fluid path by controlling heating of said sections through adjustment dependent upon indications of a condition of such fluid at progressive locations along the flow path.

37. The method of operating a heat exchanger having a once through fluid path which comprises establishing a continuous fluid flow under pressure through the path, heating the path, and maintaining a condition of the fluid at a selected different value in each of several predetermined sections of the fluid path by controlling the rate of fluid supply through adjustment dependent upon indications of a condition of the fluid at progressive locations along the flow path.

38. The method of operating a heat exchanger having a once through fluid path which comprises establishing a continuous fluid flow under pressure through the path, heating the path, and maintaining a condition of the fluid at a selected different value in each of several predetermined sections of the fluid path by controlling the rate of fluid supply and the heating through adjustment of each dependent upon indications of a condition of the fluid at progressive locations along the flow path.

39. The method of operating a heat exchanger having a once through fluid path, which comprises establishing a continuous pressure flow of fluid through the path, heating the path, and maintaining tht temperature of such fluid at a selected different value in each of several predetermined sections of the fluid path by controlling heating of said sections through adjustment dependent upon indications of temperature of such fluid at progressive locations along the flow path.

40. The method of operating a heat exchanger having a once through fluid path which comprises establishing a continuous fluid flow under pressure through the path, heating the path, and maintaining the temperature of the fluid at a selected different value in each of several predetermined sections of the fluid path by controlling the rate of fluid supply through adjustment dependent upon indications of temperature of the fluid at progressive locations along the flow path.

41. The method of operating a heat exchanger having a once through fluid path which comprises establishing a continuius fluid flow under pressure through the path, heating the path, and maintaining the temperature of the fluid at a selected different value in each of several predetermined sections of the fluid path by controlling the rate of fluid supply and the heating through adjustment of each dependent upon indications of temperature of the fluid at progressive locations along the flow path.

42. The method of heating a fluid which includes establishing a continuous fluid pressure flow in a once through path, and regulating the time of detention of the flowing fluid in a selected portion of the path by adjustment dependent upon the value of a variable condition of the fluid at progressive locations along the flow path.

43. The method of heating a fluid which includes establishing a continuous fluid pressure flow in a once through path, and regulating the time of detention of the flowing fluid in a selected portion of the path by adjustment dependent upon the value of the temperature of the fluid at progressive locations along the flow path.

44. The method of operating a heat exchanger having a once through fluid path which comprises establishing a continuous pressure flow of fluid through the path, regulating the supply of a portion of the fluid by indication of a condition of the total fluid at a location along the flow path and regulating the supply of another portion of the fluid by indication of a condition of the total fluid at another location along the flow path.

45. The method of operating a heat exchanger having a once through fluid path which comprises establishing a continuous pressure flow of fluid through the path, primarily regulating the supply of fluid to the path from indication of a condition of the fluid at a location along the flow path, and secondarily regulating the supply of the fluid from indication of a condition of the fluid at another location along the flow path.

46. The method of controlling the operation of a vapor generator of the drumless forced flow type receiving liquid under pressure at one end and delivering superheated vapor only at the other, which includes the steps of normally controlling liquid inflow in accordance with a measure of vapor outflow, and modifying such control in accordance with departure of the division zone between liquid and vapor from predetermined location in the fluid flow path.

JAMES FLETCHER.